United States Patent
Spielmann

(10) Patent No.: US 12,377,508 B2
(45) Date of Patent: Aug. 5, 2025

(54) METHOD FOR OPERATING A MACHINE TOOL, COMPUTER PROGRAM PRODUCT, CONTROL UNIT, MACHINE TOOL, SIMULATION PROGRAM PRODUCT AND USE OF THE CONTROL UNIT

(71) Applicant: Siemens Aktiengesellschaft, Munich (DE)

(72) Inventor: Ralf Spielmann, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/872,809

(22) PCT Filed: Jun. 1, 2023

(86) PCT No.: PCT/EP2023/064699
§ 371 (c)(1),
(2) Date: Dec. 7, 2024

(87) PCT Pub. No.: WO2023/237411
PCT Pub. Date: Dec. 14, 2023

(65) Prior Publication Data
US 2025/0162095 A1     May 22, 2025

(30) Foreign Application Priority Data
Jun. 8, 2022   (DE) .................... 10 2022 205 809.7

(51) Int. Cl.
*B23Q 15/12*       (2006.01)
*G05B 19/402*    (2006.01)

(52) U.S. Cl.
CPC ........... *B23Q 15/12* (2013.01); *G05B 19/402* (2013.01)

(58) Field of Classification Search
None
See application file for complete search history.

(56) References Cited

U.S. PATENT DOCUMENTS

2005/0246062 A1   11/2005   Keibel
2009/0182451 A1    7/2009   Jennessen et al.
(Continued)

FOREIGN PATENT DOCUMENTS

DE         4291619 T1    11/1994
DE      102004021468    11/2005
(Continued)

OTHER PUBLICATIONS

PCT International Search Report dated Sep. 28, 2023 based on PCT/EP2023/064699 filed Jun. 1, 2023.

*Primary Examiner* — Ryan A Jarrett
(74) *Attorney, Agent, or Firm* — Cozen O'Connor

(57) ABSTRACT

A method for operating a machine tool having a first number of machine axes that are movable via a drive and actuatable via a control unit that is configured such that, relative to a reference point on the machine tool, a coordinates transformation is performed around a second number of machine axes, includes providing a parts program for machining of a workpiece via the machine tool, a second step of determining at least one axis of rotation from among the first number of machine axes and blocking the determined at least one axis of rotation for actuations, determining control commands for a plurality of machine axes, excluding the at least one axis of rotation determined in the second step, and a fourth step in which the at least one axis of rotation determined in the second step is brought into a machining position and a corresponding rotational movement is determined.

18 Claims, 2 Drawing Sheets

(56) References Cited

U.S. PATENT DOCUMENTS

| | | | |
|---|---|---|---|
| 2010/0228384 A1 | 9/2010 | Neumaier et al. | |
| 2012/0003058 A1 | 1/2012 | Hutter et al. | |
| 2015/0277423 A1* | 10/2015 | Kondo | G05B 19/402 |
| | | | 700/193 |
| 2017/0286572 A1 | 10/2017 | Hershey et al. | |
| 2018/0239312 A1 | 8/2018 | Lee et al. | |
| 2020/0225642 A1 | 7/2020 | Gortz et al. | |

FOREIGN PATENT DOCUMENTS

| | | |
|---|---|---|
| DE | 102006024974 A1 | 12/2007 |
| DE | 102008063858 | 7/2010 |
| EP | 2216698 | 8/2010 |
| EP | 2336839 | 6/2011 |
| EP | 3045272 | 7/2016 |
| EP | 3958075 | 2/2022 |
| WO | 2011086032 | 7/2011 |

\* cited by examiner

METHOD FOR OPERATING A MACHINE TOOL, COMPUTER PROGRAM PRODUCT, CONTROL UNIT, MACHINE TOOL, SIMULATION PROGRAM PRODUCT AND USE OF THE CONTROL UNIT

CROSS-REFERENCE TO RELATED APPLICATIONS

This is a U.S. national stage of application No. PCT/EP2023/064699 filed 1 Jun. 2023. Priority is claimed on German Application No. 10 2022 205 809.7 filed 8 Jun. 2022, the content of which is incorporated herein by reference in its entirety.

BACKGROUND OF THE INVENTION

1. Field of the Invention

The invention relates to a method for operating a machine tool, a computer program product, a corresponding control unit, a machine tool having such a control unit, a simulation program product, and use of the control unit.

2. Description of the Related Art

EP 2 216 698 A2 discloses a method for generating transformed control data for a machine tool. The method includes providing control data that describes the intended machining of a workpiece, where workpiece is clamped in a location that corresponds to a desired state of a clamping situation. Further to this, an actual state of the clamping situation is determined for the workpiece and compared with the desired state of the clamping situation. A clamping situation deviation is determined therefrom and transformed control data is calculated based on the deviation.

Machine tools are employed to manufacture components with increasingly complex geometry. The number of machine axes that can be actuated in machine tools is increasing likewise. At the same time, growing demands are placed on machine tools with respect to cost efficiency in acquisition and operation, while use of the simplest possible control units is required. This particularly applies with regard to complex high-performance control units, which are not available everywhere due to legal restrictions. Furthermore, compatibility between different machine tools is desirable so that parts programs can run without difficulty on different types of machine tool.

SUMMARY OF THE INVENTION

In view of the foregoing, it is an object of the invention to provide a system and method that achieve an improvement in at least one of the above-outlined aspects.

This and objects and advantages are achieved in accordance with the invention by a method for operating a machine tool. The machine tool has a first number of machine axes via which a tool can be moved in a translatory and a rotatory manner. The machine axes therefore comprise axes of translation and axes of rotation. The machine axes can each be moved by a drive and actuated via a control unit. In particular, the machine axes can each be moved directly by a single drive. The control unit is assigned at least functionally to the machine tool. Further to this, and relative to a reference point on the machine tool, the control unit is configured to perform a coordinates transformation around a second number of machine axes. The method comprises a first step in which a parts program is provided, where the parts program is established for machining of a workpiece via the machine tool. The parts program comprises, e.g., a plurality of instructions for at least one of the drives, via which a machining path can be traversed by the tool directly along a surface of the workpiece or at a distance from the surface of the workpiece. Additionally, the method includes a second step, in which at least one axis of rotation is determined from among the machine axes. The at least one determined axis of rotation is blocked for actuations in the second step. This blocking can take the form of a mechanical lock, a suppression of control commands to the corresponding drive means and/or a rejection of control commands by the corresponding drive. The determined axis of rotation is essentially arrested in a current location or set location in the second step.

The method further comprises a third step, in which control commands are determined for a plurality of machine axes via which a parts program can be performed. The plurality of machine axes for which the control commands are determined in the third step do not include the at least one axis of rotation that was determined and blocked in the second step. The third step therefore takes place excluding the axis of rotation from the second step. In the third step, the control commands can be determined via a coordinates transformation that corresponds to the position assumed by the machine tool in the second step. In other words, the control commands in the third step are determined as though the axis of rotation that was determined in the second step did not exist.

The method further comprises a fourth step, in which the axis of rotation that was determined and blocked in the second step is unblocked again and is set in a machining position. The machining position is the position in which the machining of the workpiece must occur. The drive of the axis of rotation determined in the second step is brought into the machining position in the third step. In addition, in the third step, a corresponding rotational movement through which the axis of rotation reaches its machining position is determined. The determination of the corresponding rotational movement can include measuring an angle of rotation and a direction of rotation. The method additionally comprises a fifth step, in which an adapted set of control commands is determined for the plurality of machine axes. The adapted set of control commands is calculated based on the control commands determined in the third step and the rotational movement determined in the fourth step. To this end, a coordinates transformation of the control commands from the fourth step can occur using the axis of rotation from the fourth step. In the fifth step, the control commands from the third step are essentially converted into a position of the machine tool corresponding to the machining position that was set in the fourth step. The adapted set of control commands therefore represents a coordinates-transformed modification of the control commands from the third step. The inventive method further comprises the workpiece being machined as a result of executing the adapted set of control commands (sixth step). Using the adapted set of control commands, the drive of a plurality of machine axes are actuated and the tool is set into motion.

The inventive method allows parts programs to be transferred to different machine tools with ease. As a result of the intervening block of the at least one axis of rotation, the number of degrees of freedom is reduced, thereby allowing a simpler coordinates transformation around fewer machine axes. The required computing effort is reduced thereby.

In an embodiment of the method, the first number of machine axes can comprise three axes of rotation, in particular exactly three axes of rotation.

In a further embodiment of the method, the first number of machine axes is greater than the second number of machine axes. Accordingly, the machine tool has more machine axes than can be processed by the coordinates transformation. In particular, the first number can be five and the second number four. Alternatively, the first number can be six or seven and the second number five. Control units with a smaller number of machine axes that can be processed, i.e., coordinates-transformed, are particularly cost efficient and readily available. The inventive method makes it possible using a simple control unit with a reduced number of coordinates-transformable machine axes to achieve substantially the same technical advantages as when using a more complex control unit with which more machine axes are coordinates-transformable.

In addition, the reference point of the machine tool in the inventive method can be a tool center point. The tool center point (TCP) can be, e.g., a tip of a milling cutter, a center of a cutting disk, a tip of a robot manipulator or an output nozzle of a painting device. The execution of the parts program can easily be described via the tool center point.

In a further embodiment of the method, at least one of the machine axes can be established to move the tool or to move the workpiece. The tool that is moved can be a milling cutter, for example. The machine axis which moves the workpiece can be, e.g., a rotatable clamp of the workpiece as in the case of a lathe, for example. The inventive method can therefore be transferred to a multiplicity of machine tools.

Furthermore, the fourth and fifth steps of the disclosed method can be performed for a plurality of axes of rotation. For example, the machine tool can be blocked around a plurality of axes of rotation, and a suitable coordinates transformation for control commands can be performed successively for each of the blocked axes of rotation individually or in combination, in order to determine an adapted set of control commands. Therefore the disclosed method is readily transferable to complex machine tools having a greater number of machine axes, e.g., machine tools having eight machine axes. The disclosed method is particularly suitable for use with robot manipulators having a multiplicity of joints and axes of rotation. As a consequence, the disclosed method is also suitable for future machine tools having greater complexity and can be deployed over a particularly long time.

In the disclosed method, an orientation of the tool relative to a surface of the workpiece can be determined in the third and/or fifth step. The orientation comprises in particular an angle between a main axis of the tool and at least a section of the surface of the workpiece. In the case of a tool in the form of a painting device, the angle at which paint is sprayed onto the surface of the workpiece may be process-relevant. Furthermore, in the case of tools, such as a spherical cutter, the orientation thereof relative to the workpiece may be critical with respect to the manufacturing quality that can be achieved. An orientation, i.e., a direction of clamping, of the workpiece can be specified by a user and/or a suitable input device for this purpose. The orientation can be taken into account for at least one of the coordinates transformations in the inventive method. The representation of the orientation of the tool is compatible with the coordinates transformations, so that the inclusion of the orientation can be implemented with reduced computing effort. At least one of the steps of the inventive method can be performed repeatedly until a desired orientation of the tool is achieved. The inventive method can therefore be performed to a large extent autonomously. Alternatively or additionally, in the case of material removal machining, a surface quality of the machined workpiece can be set via a suitable angular position of the tool relative to the surface of the workpiece.

In a further embodiment of the method, the tool can have an asymmetric or chiral configuration. An asymmetric tool can be a tool with a blade, such that the suitability of the tool is conditional upon the orientation thereof. A chiral tool is understood to mean, e.g., a hand of a robot manipulator that cannot be brought into a desired alignment via a single rotational movement. The inventive method is capable of readily taking such additional details into account and consequently has a wide potential range of use. In particular, it is possible by virtue of the inventive method to avoid erroneous activation following the coordinates transformation, thereby in turn allowing reliable operation of the machine tool.

In addition, the tool can be a drill, a milling cutter, a spherical cutter, a cutting disk, a robot manipulator, a welding device, a 3D print head, a laser, a water jet device, a plasma beam device, or a painting device. Such machine tools are produced with an increasing number of machine axes. At the same time, it is preferable to operate these tools using control units that are as simple as possible. The inventive method makes it possible to traverse machining paths with greater precision and thus to machine workpieces more accurately. The inventive method is therefore suitable for a multiplicity of different machine tools.

In the inventive method, during execution of the adapted set of control commands, it is only possible to move those machine axes for which control commands were determined in the third step. The axis of rotation that was blocked in the second step can therefore be blocked, i.e., remain fixed, during execution of the adapted set of control commands. In particular, during material removal machining of the workpiece, the axis of rotation that was blocked in the second step can be held in the machining position in such that a lever arm length from the blocked axis of rotation to the tool is minimized. It is thereby possible to minimize vibration of the workpiece and to increase the manufacturing precision that can be achieved. The possible depth of cut can likewise be increased, and therefore the achievable volume of material removal per time unit. This likewise results in increased productivity of the machine tool. Accessibility to the tool is also increased thereby.

In accordance with the inventive method, the at least one axis of rotation that is blocked in the second step can also be determined with reference to a specification that is fixed or settable. For example, it is possible to specify which at least one axis of rotation must be blocked in the second step for a given type of machine tool. This represents a fixed specification. Equally, the axis of rotation can be determined by a user specification, via which the axis of rotation is selected directly, or based on a criterion that can be specified by the user. Alternatively, the at least one axis of rotation that is blocked in the second step can be determined based on an algorithm that is structured to evaluate the parts program. Inter alia, the execution of the adapted set of control commands can be simulated by the algorithm. Based on the simulation, it is possible to determine a settable criterion that provides a basis for selecting the axis of rotation. For example, an expected vibration of the workpiece and/or tool can be determined, thereby allowing the axis of rotation that is to be blocked in the second step to be selected such that the least vibration is expected. Alternatively or additionally, it is also possible to determine an energy requirement or wear during the execution of the adapted set of control commands. The inventive method can be performed in a plurality of cycles. The algorithm can be formed as an optimization algorithm, in particular as artificial intelligence with simulation of the machine tool. The inventive method can therefore be combined with a multiplicity of algorithms for optimizing the operation of the respective machine tool. These can be, e.g., optimizations with respect to a minimized energy requirement, a minimum machining duration or a minimized wear of the tool and/or drive. Full advantage is therefore taken of the technical potential of the corresponding machine tool.

The objects and advantages are also achieved in accordance with the invention by a computer program product that is configured for the operation of a machine tool. The computer program product is suitable for processing a parts program and correspondingly for outputting an adapted set of control commands to the machine tool. The computer program product is suitable for execution on a control unit that is at least functionally assigned to the machine tool. The computer program product can be monolithic, i.e., configured for execution on a single hardware platform. Alternatively, the computer program product can be modular, i.e., comprise a plurality of partial programs that execute on different hardware platforms and interact via a communicative data connection, e.g., via an internet connection or a mobile radio connection. In accordance with the invention, the computer program product is configured to perform at least one of the disclosed embodiments of the inventive method. The inventive computer program product requires only limited computing power for sufficiently rapid execution. As a consequence, the inventive computer program product can be executed on the control unit with essentially no impact on performance.

The objects and advantages are likewise achieved in accordance with the invention by a control unit that is configured to operate a machine tool. The control unit is suitable for activating a drive, one for each machine axis of the machine tool. In order to achieve this, the control unit has a memory unit and a computing unit (processor), these being configured to execute a computer program product on the control unit. In accordance with the invention, the control unit is configured to perform at least one embodiment of the method in accordance with the disclosed embodiments. Alternatively or additionally, the computer program product, which is executably stored on the control unit, can be configured in accordance with the disclosed embodiments.

The objects and advantages are also achieved in accordance with the invention by a machine tool. The machine tool comprises a plurality of machine axes, each of which can be actuated via a drive, and a control unit. The control unit is configured to activate, i.e., actuate, the drive in accordance with an adapted set of control commands. The control unit is inventively configured in accordance with the disclosed embodiments.

The objects and advantages are additionally achieved in accordance with the invention by a simulation program product that is suitable for simulating the operating characteristics of a control unit of a machine tool. In this context, a simulation program product is understood to mean a computer program product that is intended for the purpose of simulation. With the simulation program product, it is possible to simulate the operating characteristics of at least the control unit. In addition, a movement of a tool of the machine tool can also be included in the simulated operating characteristics. In accordance with the invention, the simulated operating characteristics comprise at least a traversal of a machining path by the tool of the machine tool. The machining path that must be traversed is ascertained by an adapted set of control commands, which can be generated via the control unit to be simulated. The adapted set of control commands is determined in accordance with an embodiment the inventive method. The simulation program product can be formed, e.g., as a "digital twin", as described, e.g., in U.S. Pub. No. 2017/286572 A1, of the control unit and/or of the machine tool. The disclosure contents of U.S. Pub. No. 2017/0286572 A1 are incorporated herein by reference in its entirety. With the simulation program product, it is possible to test and validate various adapted sets of control commands. The adapted sets of control commands can be determined quickly via the disclosed embodiments of the method, for the simulation program product to evaluate directly. As a consequence, the inventive simulation program product can also be performed quickly, so that a multiplicity of adapted sets of control commands per simulation can be evaluated in a time-saving manner. The simulation program product can therefore readily be performed in parallel with the operation of the machine tool. The simulation program product can be configured to evaluate and select simulated adapted sets of control commands in accordance with a settable criterion.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in greater detail below with reference to an embodiments in the figures, where the features of the embodiments depicted in the figures can be combined with the features outlined above, in which.

DETAILED DESCRIPTION OF THE EXEMPLARY EMBODIMENTS

Figure 1:
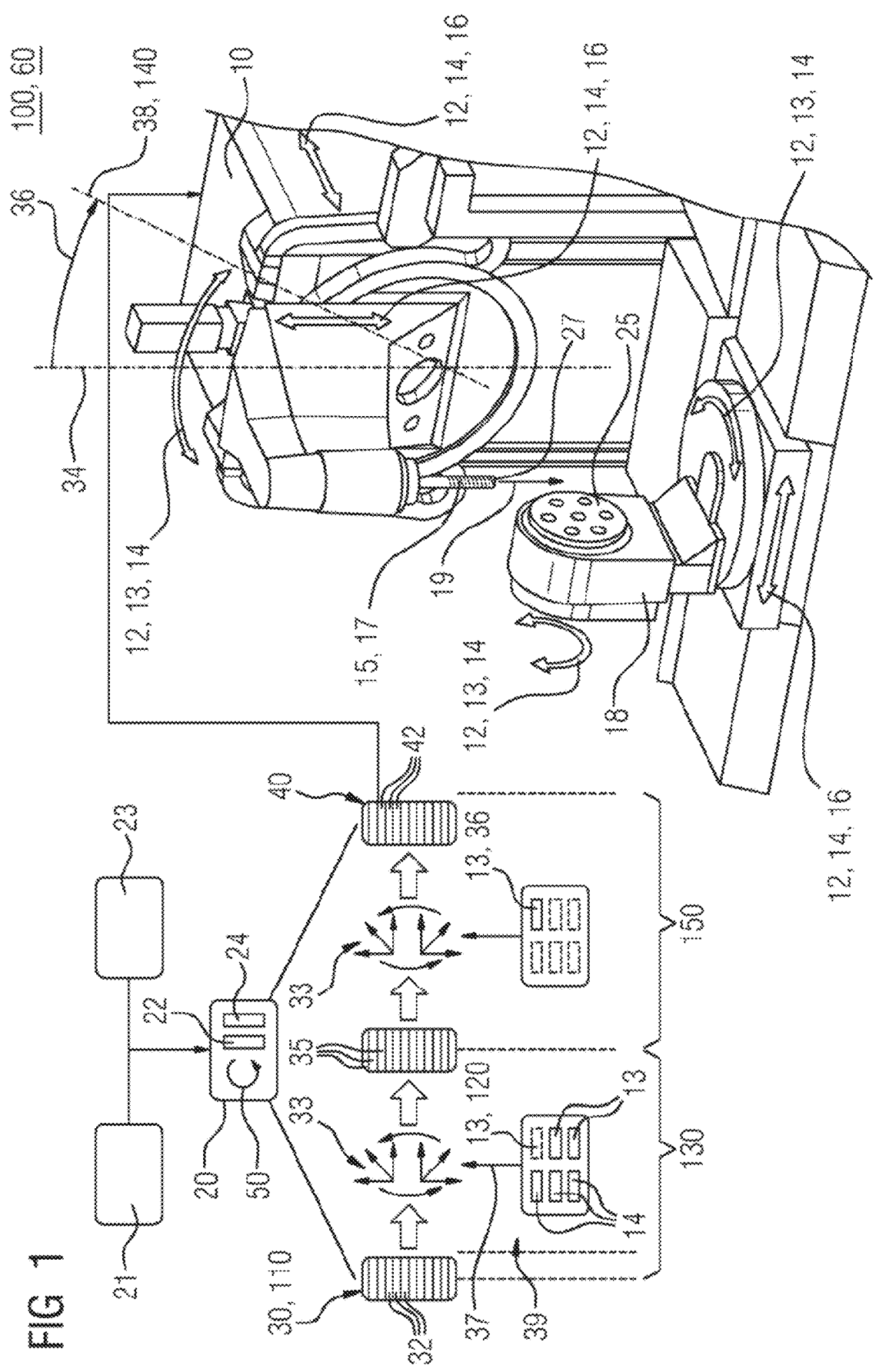
FIG. 1 shows a schematic illustration of a first embodiment variant of the method in accordance with the invention.

A first embodiment of the inventive method 100 is schematically illustrated in FIG. 1. The method 100 is used to operate a machine tool 10 that has a plurality of machine axes 14, around which or along which a tool 15 can be moved. The tool 15 is formed as a milling cutter 17 and is suitable for machining a workpiece 25 (not shown in detail) in a manner that removes material. The tip of the milling cutter 17 forms a reference point 27 on the machine tool 10, specifically the "tool center point" (TCP). The machine tool 10 is therefore a milling machine. The workpiece 25 can be clamped in a clamp 18 of the machine tool 10. The clamp 18 is configured to be rotatable around an axis of rotation 13. Each of the machine axes 14 is coupled at least functionally to a drive 12 (not shown in detail), so that the respective machine axis 14 can be actuated. The machine tool 10 shown in FIG. 1 comprises three axes of translation 16 and three axes of rotation 13, via which the tool 15 can be guided and/or aligned along a machining path. The drive 12 is coupled at least functionally to a control unit 20 which is configured to actuate the drive 12. The control unit 20 comprises a computing unit 22 and a memory unit 24, these being designed to execute a computer program product 50 via which the inventive method 100 is performed.

The method 100 comprises a first step 110, in which a parts program 30 is provided, this comprising a plurality of parts program commands 32, via which a machining path of the tool 15 relative to the workpiece 25 is specified. The parts program 30 is therefore independent of the machine tool 10 that is deployed. The parts program 30 undergoes further processing in the inventive method 100 to machine the workpiece 25. The method 100 further comprises a second step 120, in which one of the axes of rotation 13 is determined from among the machine axes 12 of the machine tool 10 and is then blocked. As a result of the block, the determined axis of rotation 13 remains in a blocked position 34. This is effected by via mechanical locking, by suppressing control commands to the corresponding drive 12, and/or via the corresponding drive 12 rejecting the receipt of control commands that result in a movement. The axis of rotation 13 that is blocked in the blocked position 34 is selected via user input at an input unit 21 or via an algorithm 23 which is configured to evaluate the parts program 30. In particular, the algorithm 23 is configured to ascertain which of the axes of rotation 13 is most appropriate for the second step 120.

Furthermore, in a third step 130 of the inventive method 100, control commands 35 are determined based on the parts program 30. For the purpose of determining the control commands 35, a coordinates transformation 33 is applied to the parts program 30. The control unit 20 is configured to perform a coordinates transformation 33 around a number of machine axes 14, where the number is smaller than the number of machine axes 14 of the machine tool 10. During the coordinates transformation 33, the three axes of translation 14 and two axes of rotation 13 of the machine tool 10 are taken into account. The control unit 20 is therefore suitable for performing a coordinates transformation 33 around five machine axes 33 at once. The machine axes 14 that are taken into account, i.e., the three axes of translation 14 and the two axes of rotation 13, belong to a set of machine axes 39. The set of machine axes 39 being taken into account is indicated by the arrow 37. The axis of rotation 13 that is determined and blocked in the second step 120 is excluded from the coordinates transformation 33. The exclusion of the blocked axis of rotation 13 is symbolized in FIG. 1 by the broken lines in the set of machine axes 39.

In a fourth step 140 of the inventive method 100, the axis of rotation 13 that was determined and blocked in the second step 120 is unblocked, i.e., released for movement. The tool 15 is moved around the corresponding axis of rotation 13 and brought into a machining position 38. During the fourth step 140, the rotational movement 36 with which the axis of rotation 13 is brought from the blocked position 34 into the machining position 38, is likewise captured. To this end, a direction of the rotational movement 36 and an associated angle of rotation as a numerical value are captured. In a fifth step 150 following thereupon, a coordinates transformation 33 is applied to the control commands 35 determined in the third step 130. The coordinates transformation 33 in the fifth step 150 occurs excluding around the axis of rotation 13 that was determined and blocked in the second step 120. Here, the coordinates transformation 33 in the fifth step 150 takes into account the rotational movement 36 that was captured in the fourth step 140, i.e., the direction and angle of rotation as a numerical value thereof. As a result of the coordinates transformation 33 performed in the fifth step 150, an adapted set of control commands 40 comprising a plurality of adapted control commands 42 is generated. The adapted control commands 42 each relate to a drive 12 of the machine tool and are suitable for causing an actuation of the respective drive means 12. With the coordinates transformation 33 performed in the fifth step 150, the control commands 35 provided in the third step 130 are adapted to the machining position 38 assumed by the axis of rotation 13 that was determined in the second step 120 during execution of the adapted set of control commands 40.

The method 100 also takes into account an orientation 19 of the tool 15. The method 100 is repeated, selecting a different axis of rotation 13 in the second step 120, if an initially determined adapted set of control commands 40 results in an orientation 19 of the tool 15 in which the desired machining of the workpiece 25 is impossible or at least impractical. Taking the orientation 19 of the tool 15 into account, in this way, can be performed by the algorithm 23. The algorithm 23 can also be configured to determine an expected energy requirement and/or an expected wear of the machine tool 10, in particular of a drive 12 and/or of the tool 15. To this end, the algorithm 23 can be formed as an optimization algorithm, in particular as artificial intelligence. The set of control commands 40 that is determined following one or more cycles of the method 100 is output to the machine tool 10 in order to machine the workpiece 25.

Furthermore, the operating characteristics of the control unit 20 of the machine tool 10 are represented by a simulation program product 60 (not shown in detail). The simulation program product 60 is formed as a digital twin, in which mechanical characteristics of the machine tool 10 can also be represented. The mechanical characteristics of the machine tool 10 comprise inter alia vibration characteristics of the machine tool 10 around at least the axes of rotation 13 thereof. With the simulation program product 60, it is possible to test an adapted set of control commands 40 that has been determined in a cycle of the inventive method 100. In particular, it is thereby possible to calculate the extent to which vibrations at the machine tool 10 are to be expected and to what extent these have an effect on the expected manufacturing accuracy. The adapted sets of control commands 40 that are determined by the inventive method 100 can easily be evaluated by the simulation program product 60, and therefore a greater number of adapted sets of control commands 40 can be tested quickly. The simulation program product 60 is suitable for allowing the inventive method 100 to execute in a plurality of cycles in order to obtain greater manufacturing accuracy. For this purpose, the simulation program product 60 comprises a digital representation of the control unit 20 and the machine tool 10, in particular the associated drive 12.

Figure 2:
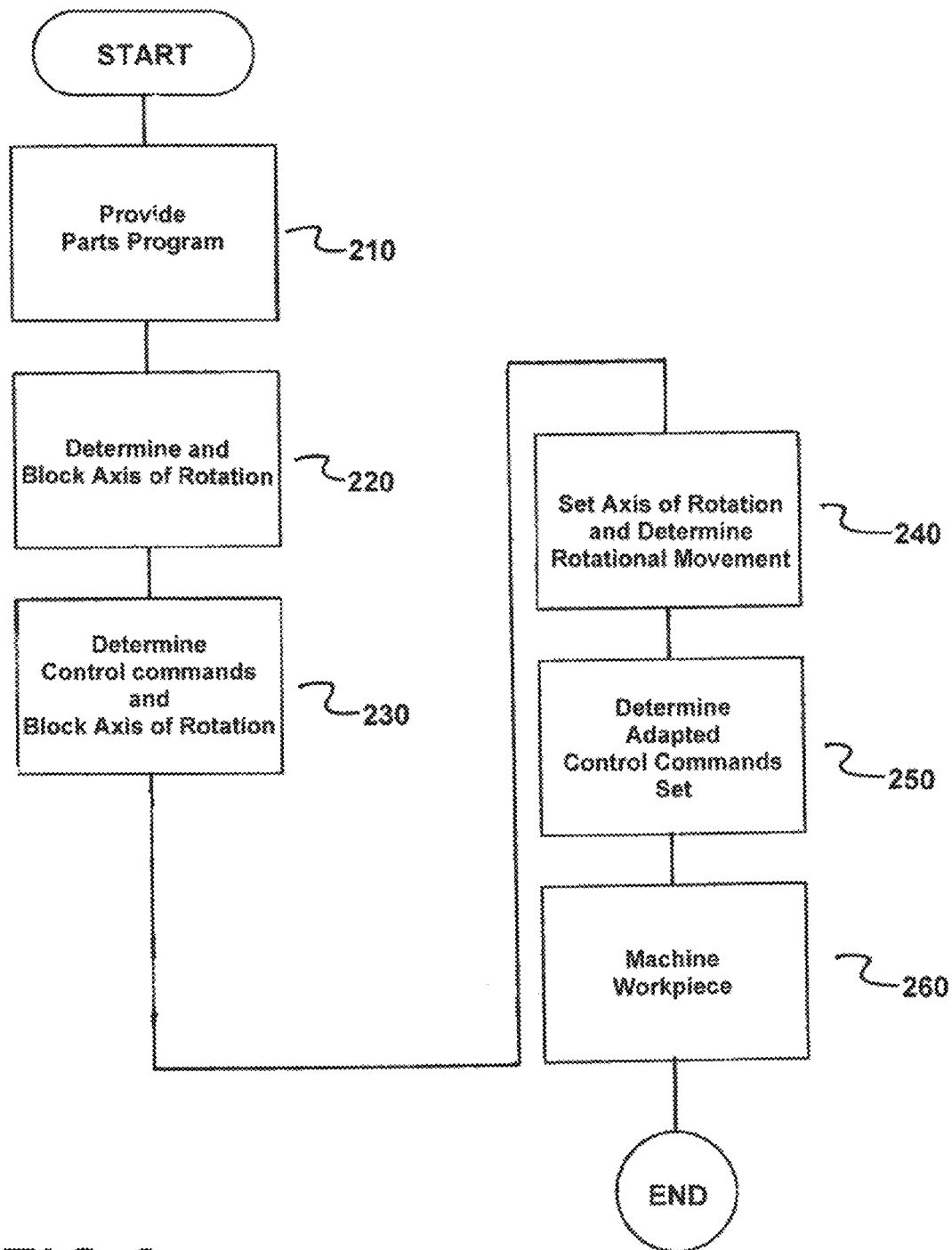
FIG. 2 is a flowchart of the method in accordance with the invention.

FIG. 2 is a flowchart of the method 100 for operating a machine tool 10 having a first number of machine axes 14 that are each moveable via a drive 12 and are each actuatable via a control unit 20 that is configured to perform a coordinates transformation 33 around a second number of machine axes 12 relative to a reference point 27 on the machine tool 10. The method comprises a) providing a parts program 30 for machining of a workpiece 25 via the machine tool 10, as indicated in step 210.

Next, b) at least one axis of rotation 13 is determined from among the machine axes 12 and the at least one axis of rotation 13 is blocked for actuations, as indicated in step 220.

Next, c) control commands 35 for a plurality of machine axes 12 excluding the at least one axis of rotation 13 determined in step 220 are determined, as indicated in step 230.

Next, d) the at least one axis of rotation 13 determined in step 220 is set into a machining position 38 and a corresponding rotational movement 36 is determined, as indicated in step 240.

Next, e) an adapted set of control commands 40 for the plurality of machine axes 12 is determined based on the control commands 35 determined in step 230 and the rotational movement 36 determined in step 240, as indicated in step 250.

The workpiece 15 is now machined via execution of the adapted set of control commands 40, as indicated in step 260.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a machine tool having a first number of machine axes which are each moveable via a drive and are each actuatable via a control unit which is configured to perform a coordinates transformation around a second number of machine axes relative to a reference point on the machine tool, the method comprising:
   a) providing a parts program for machining of a workpiece via the machine tool;
   b) determining at least one axis of rotation from among the machine axes and blocking the at least one axis of rotation for actuations;
   c) determining control commands for a plurality of machine axes excluding the at least one axis of rotation determined in step b);
   d) setting the at least one axis of rotation determined in step b) into a machining position and determining a corresponding rotational movement;
   e) determining an adapted set of control commands for the plurality of machine axes based on the control commands determined in step c) and the rotational movement determined in step d); and
   f) machining the workpiece via execution of the adapted set of control commands.

2. The method as claimed in claim 1, wherein the first number of machine axes comprises at least three axes of rotation.

3. The method as claimed in claim 2, wherein the first number of machine axes is greater than the second number of machine axes.

4. The method as claimed in claim 2, wherein the reference point of the machine tool is a tool center point.

5. The method as claimed in claim 1, wherein the first number of machine axes is greater than the second number of machine axes.

6. The method as claimed in claim 5, wherein the reference point of the machine tool is a tool center point.

7. The method as claimed in claim 1, wherein the reference point of the machine tool is a tool center point.

8. The method as claimed in claim 1, wherein at least one of the machine axes is arranged to move a tool or the workpiece.

9. The method as claimed in claim 1, wherein steps d) and e) are performed for a plurality of axes of rotation.

10. The method as claimed in claim 1, wherein an orientation of the tool relative to a surface of the workpiece is determined in at least one of step c) and e).

11. The method as claimed in one of claim 1, wherein the tool has an asymmetric or chiral configuration.

12. The method as claimed in claim 1, wherein the tool is one of a drill, a milling cutter, a spherical cutter, a turning tool, a cutting disk, a robot manipulator, a welding device, a 3D print head, a laser, a water jet device, a plasma beam device and a painting device.

13. The method as claimed in claim 1, wherein when executing the adapted set of control commands, only those machine axes for which control commands were determined in step c) are moved.

14. The method as claimed in claim 1, wherein the at least one axis of rotation is determined in step b) with reference to a fixed or settable specification or based on an algorithm which is established to evaluate the parts program.

15. A computer program product stored on a non-transitory computer-readable medium for operating a machine tool, being designed to process parts programs and to output an adapted set of control commands to the machine tool, wherein the computer program product is configured to perform the method as claimed in claim 1.

16. A control unit for operating a machine tool, being designed to activate a drive for machine axes of the machine tool and being designed to execute a computer program product by means of a memory unit and a computing unit, wherein the control unit is configured to perform the method as claimed in claim 1.

17. A control unit for operating a machine tool, being designed to activate a drive for machine axes of the machine tool and being designed to execute a computer program product by means of a memory unit and a computing unit, wherein the control unit includes the computer program product as claimed in claim 15.

18. A machine tool comprising a plurality of machine axes which are each actuatable via at least one drive, and a control unit which is configured to activate the drive, wherein the control unit is configured as claimed in claim 16.

* * * * *